INVENTOR.
ARNOLD M. HALL

Aug. 27, 1968 — A. M. HALL — 3,398,713
TRACTIVE AIR CUSHION VEHICLE
Filed Aug. 24, 1966 — 5 Sheets-Sheet 3

INVENTOR.
ARNOLD M. HALL
BY Brumbaugh, Free, Graves & Donohue
his ATTORNEYS

INVENTOR.
ARNOLD M. HALL
BY
Brumbaugh, Free, Graves & Donohue
his ATTORNEYS

United States Patent Office 3,398,713
Patented Aug. 27, 1968

1

3,398,713
TRACTIVE AIR CUSHION VEHICLE
Arnold M. Hall, Noank, Conn., assignor to General Dynamics Corporation, New York, N.Y., a corporation of Delaware
Filed Aug. 24, 1966, Ser. No. 574,668
26 Claims. (Cl. 114—67)

ABSTRACT OF THE DISCLOSURE

An air cushion amphibious vehicle capable of both airborne and overland travel, including fore and aft large inflatable rollers which support the vehicle for overland operation and are deflatable and retractable for water borne operation. During airborne operation, the surfaces of the rollers receive air under superatmospheric pressure from an air chamber, which exhausts through a levitation jet channel formed between a respective roller surface and a portion of the vehicle body. The rollers are rotated in a direction to direct at least a portion of the air in the levitation jet channel underneath the vehicle in the air cushion region to maintain a vortex of air around at least a portion of each roller surface when the vehicle is supported on the cushion.

---

This invention relates to vehicles for traveling over the surface of land or water and of the type which is fully or partially supported on a cushion of air developed beneath the vehicle body. In particular, the invention relates to improved vehicles of this type which are characterized, in addition, by a wheeled mode of operation and have a capability of operation over several kinds of terrain.

The importance and contribution of ground effect machines to both commercial and military transportation and supply have been recognized, and several types of air cushion vehicles have been developed. Most of these, however, are limited to travel at moderate velocities only or to operation over a particular kind of terrain and are not suited for direct or wheeled engagement with a ground surface. Other known vehicles which utilize partial or full air cushion lift lack adequate hill climbing traction, while others are not well adapted for travel over very soft or wet land areas. Certain known wheeled amphibious vehicles, such as the wheeled hydro-foil, are disadvantageous in that they include a heavy basic vehicle structure which requires the use of heavy machinery in order to develop sufficient lift.

In general, it is this lack of versatility which renders these known vehicles unsatisfactory for use in support of, for example, military operations where the impediments to successful logistic maneuvers are pronounced. Desirably, an amphibious air cushion vehicle should have a capability of running at both high and low speeds over relatively flat terrain and at low speeds over terrain which is normally difficult to traverse. Thus far, it has been the practice to develop one type of vehicle for overwater medium range operations and a separate vehicle operable at only moderate or low speeds over land.

In air cushion vehicles, a considerable volume of pressurized or compressed air is required to maintain an air cushion beneath the vehicle. In an attempt to avoid power losses due to friction and turbulence in substantial lengths of ducting in the vehicle, it has been proposed to locate rotary fluid pumps near a periphery of the vehicle for imparting energy to a curtain of fluid exhausting from a

2 port in the bottom of the vehicle. Although this construction offers the advantage of eliminating extensive ducting for carrying the air from a main supply source to the exhaust port, it does not lend itself well to vehicles which must also have a wheeled overground mode of operation and such additional equipment that would be required to adapt these vehicles to overland travel tends to add prohibitive weight.

It is therefore among the objects of this invention to provide a vehicle having versatility encompassing both high and low speed overland modes of operation with either partial or full lift support furnished by air levitation jets operating in conjunction with an improved lift system.

A further object of the invention is to provide an air cushion vehicle which is equipped with ground engageable rotatable rollers which function both to drive the vehicle in a wheeled mode of operation and to augment vehicle levitation in the airborne mode.

Still a further object of the invention is to incorporate ground engageable rollers into a levitation system which products a fluid layer vortex around the rollers to pump air into the cushion beneath the vehicle.

Yet a further object of this invention is to provide improved roller construction and drive systems for soft roller air cushion vehicles.

Another object of the invention is to provide improved air cushion vehicle lift systems.

In brief, these and other objects of the invention are attained by providing the vehicle with an elongated element rotatably mounted to the vehicle to have a portion of the element surface located below the lower surface of the vehicle. Fluid at superatmospheric pressure is supplied to an upper portion of the surface of the element to develop thereover, when the vehicle is operating, a fluid levitation jet directed toward the ground (or water) surface. The elongate rotatable element, preferably in the form of a large soft roller having an axis of rotation parallel to the periphery of the cushion, is rotated during airborne operation to maintain a vortex around its surface in a direction of circulation to feed the vortex fluid underneath the element into the air cushion region beneath the vehicle. During overland travel, the roller (or rollers) supports the vehicle in a conventional manner.

In other embodiments, the roller or rollers may have associated therewith an endless belt moving longitudinally over the surface of the roller. In this configuration, the belt itself acts upon the issuing levitation jet to form the vortex layer around its outer surface. Also in a preferred embodiment, the rollers are retractable into the vehicle body for high speed performance.

For a better understanding of the invention and the further advantages thereof, reference may be made to the following detailed description, and to the accompanying drawings wherein.

Figure 1:
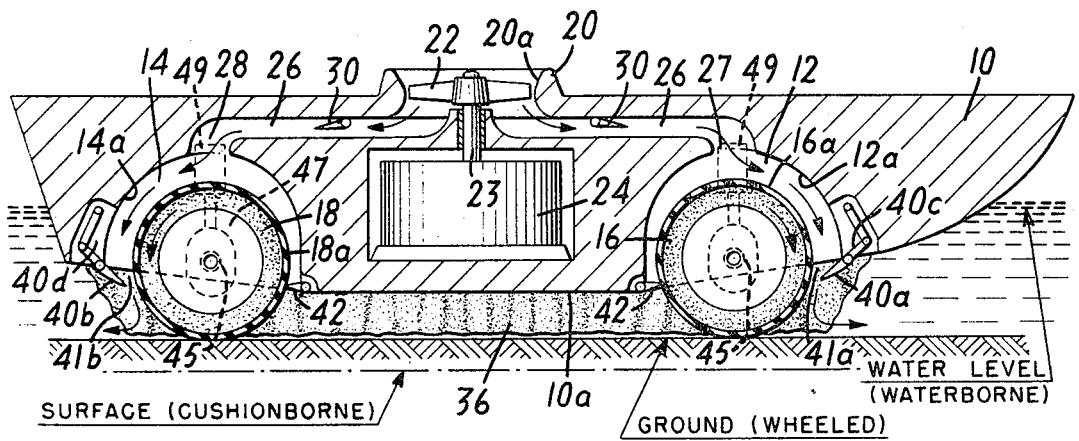
FIGURE 1 is a longitudinal cross-sectional view of a vehicle constructed in accordance with the invention, taken along the line 1—1 in FIGURE 2.
Figure 2:
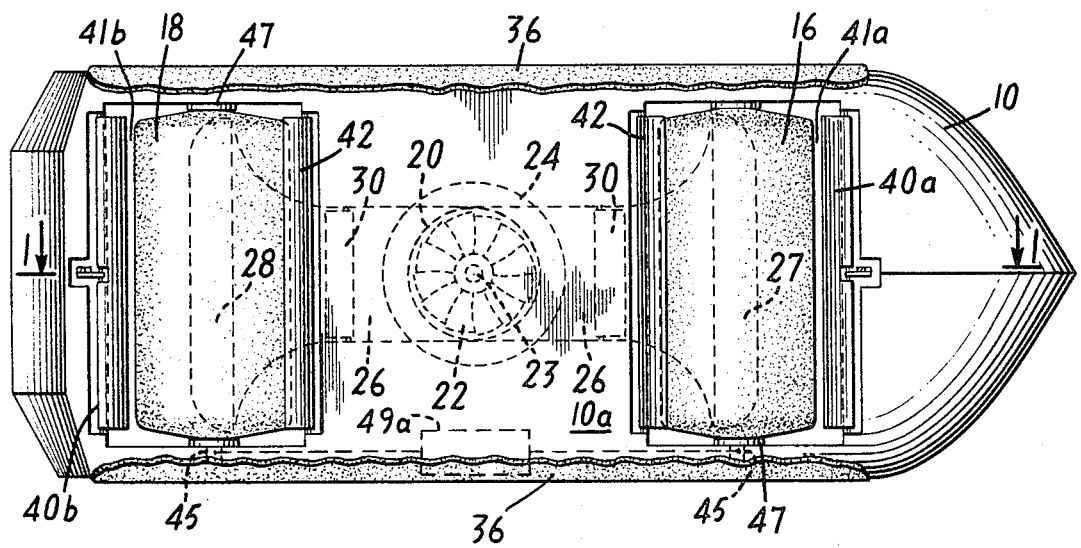
FIGURE 2 is a bottom view of the vehicle shown in FIGURE 1.
Figure 3:
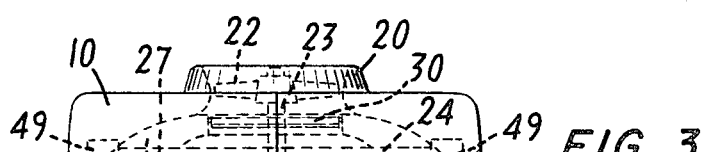
FIGURE 3 is a front view of the FIGURE 1 vehicle.

FIGURES 1–3 depict a basic amphibious craft capable of being supported on a cushion of air maintained beneath its under-surface. As shown, the vehicle is generally rectangular in shape and has a forward portion formed in a prow to enhance vehicle performance in water. The vehicle body 10 includes a pair of laterally extending interior air supply chambers 12, 14 adjacent which a pair of soft deflatable rollers 16 and 18, respectively, are mounted so that the outer portions of the roller surfaces 16a, 18a extend below the lower surface 10a of the vehicle for wheeled and airborne operation. The rollers, in the positions shown, movably support the vehicle during wheeled operation in which the rollers themselves are in direct engagement with the ground surface. As illustrated, the top surface of the vehicle is relatively flat to provide a platform for the mounting of, for example, military armament systems. However, the vehicle may be provided with a cockpit, cabin or other similar structure as desired.

Located at the top of the vehicle is a coaming 20 which forms an annular inlet duct 20a through which ambient air is taken and raised to superatmospheric pressure by an air compressor, represented schematically in the drawing by a single fan or impeller 22. The impeller 22 is coupled through a shaft 23 to a suitable power plant 24 situated within the vehicle body 10. From the compressor 22 the air at superatmospheric pressure is directed through ducts 26 to elongated supply ports 27 and 28 communicating with the air chambers 12 and 14 respectively. Volumetric air flow through the air ducts 26 is regulated by pivoted vanes 30 located in the ducts and movable to constrict the effective area thereof. The pressurized air which is exhausted into the chambers 12, 14 acting over the vertically projected area of the rollers produces the support, i.e. suspension, of the rollers which is essentially equal to the portion of the total vehicle weight supported by the rollers. A downwardly directed cushion-containing jet, i.e. a high velocity column or sheet of air is created between throttling valves 40a and 40b and roller surfaces 16a and 18a respectively. It should be mentioned that although only a single source of pressurized air is shown, it is understood that one or more independent sources can be employed to feed each chamber.

Figure 4A:
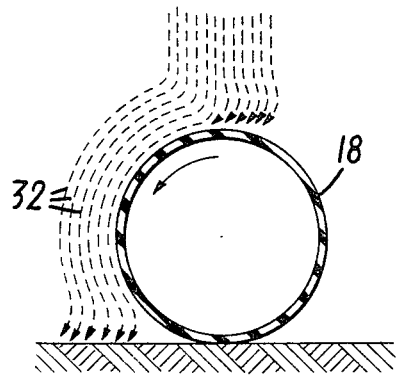
FIGURES 4A and 4B are schematic illustrations useful in explaining air flow patterns about the circumference of rollers employed in vehicles in accordance with the invention.
Figure 4B:
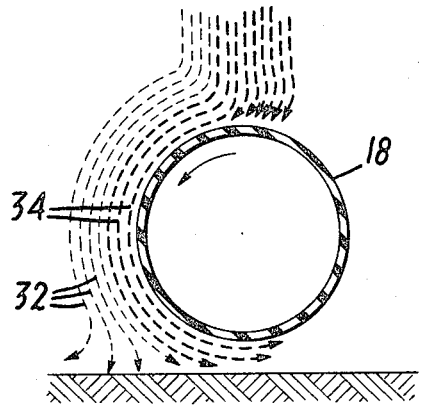

For purpose of explanation, the air flow pattern of the levitation jet initially formed over the rear roller 18 is shown diagrammatically in FIGURE 4A. To initially levitate the vehicle with the rollers free of the ground, external aerodynamic lift may be used, or wipers 42 may be actuated to allow pressurized supply air to fill beneath the vehicle, or an alternate duct from the fan leading directly to the vehicle bottom 10a may be employed. In accordance with the invention, once the vehicle is airborne, the rollers 16, 18 are rotated in the directions indicated by the arrows (FIGURE 1) so that a fluid votex layer or "Coanda" jet 34 is formed around a portion of the roller surface, as indicated in FIGURE 4B. With rotation of the rollers in the directions shown, the fluid in the vortex layers 34 is fed under the rollers to the air cushion region underneath the vehicle, thus creating and maintaining a fore and aft air cushion sealing periphery. A flexible side wall or skirt 36 at either side of the vehicle laterally contains the air cushion.

From the foregoing, it is seen that the rollers have the dual function of supporting the vehicle during the wheeled mode of operation and acting as vortex layer pumps once the vehicle is airborne. Moreover, because of the relatively large diameter of the soft rollers the desired low "footprint" pressure for good performance over soft terrain is realized.

Returning to FIGURE 1, throttling valves 40a, 40b, located adjacent the air supply chambers 12, 14 and extending over a length substantially equal to the width of the rollers, are movable inwardly and outwardly relative to the roller surfaces to obtain optimum adjustment of the radial thickness of the levitation and vortex fluid layer by constricting or opening the respective exhaust ports 41a, 41b. These valves are in the form of hinged flaps which are connected by suitable linkages 40c, 40d to actuators (not shown). In addition, the flaps 40a, 40b furnish a directional control for air flowing over the roller surfaces so that the angle formed between the curtain of air and the surface over which the vehicle is to be supported can be changed. Sealing flaps or wipers 42a, 42b, similar in construction to the flaps 40a, 40b and disposed adjacent the roller surfaces at the bottom vehicle surface, serve to prevent direct loss of supply air pressure into the air cushion region. In addition the flaps 42a, 42b check unwanted recirculation of the vortex into the supply chambers.

Figure 9:
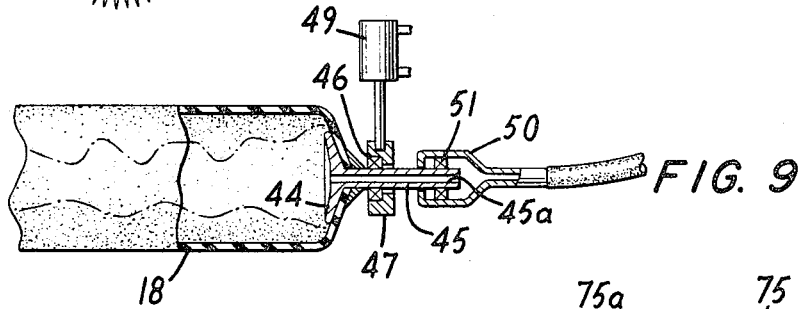
FIGURES 9–11 are front elevations, partially cut away to show the internal structure of rollers suitable for use in vehicles in accordance with the invention.

In accordance with the invention, the rollers 16 and 18 are supported for extension above or below the bottom surface of the vehicle body 10. This feature is in keeping with the capability of the vehicle to travel at higher speeds in water or, in the case of the vehicle shown in FIGURES 5 and 6 to be discussed shortly, to decrease the frontal area of the vehicle and thereby decrease the coefficient of drag during high speed operation. Retraction of the rollers is also accompanied by roller deflation such that the rollers may be completely accommodated within the air supply chambers 12, 14. A representative scheme for retraction and extension of the rollers may be seen in FIGURE 1 and FIGURE 9. As shown, the deflatable roller 18, which is representative of both rollers, is mounted on hubs 44 (FIGURE 9) having axially extending shafts 45 journaled in the bearings 46 of bearing support housings 47. Connected to each bearing housing 47 is the shaft of a hydraulic actuator or jack 49 which, when actuated, raises or lowers the housing 47 and shaft 45. The housing members 47 are preferably guided for vertical motion by suitable means such as a channel (not shown) associated with the vehicle body 10.

One of the shafts 45 of each roller includes a passage 45a through which inflation air is supplied to the interior of the roller. A supply coupling 50 containing an annular bearing and sealing member 51 couples the hollow shaft to the air supply (not shown) for rotatable relative motion between the shaft 45 and coupling. To deflate the roller, the air is exhausted, and a partial vacuum may be applied to the air supply coupling 50 to ensure complete collapse.

The rollers 16 and 18 may be driven by a conventional power plant, such as the motor shown schematically at 49a (FIGURE 2) mechanically coupled to the roller shafts 45 by any suitable chain, shaft or gear drive indicated by the dashed lines.

Figure 6:
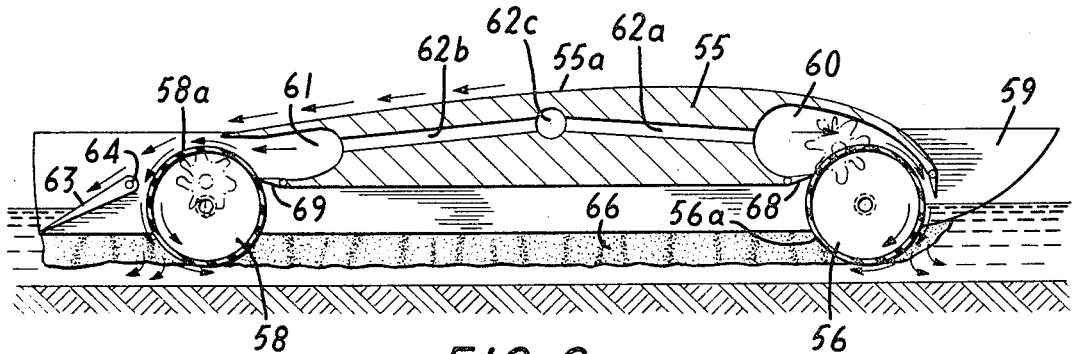
FIGURE 6 is a longitudinal cross-sectional view of the vehicle shown in FIGURE 5, taken generally along the line 6—6 of that figure.
Figure 5:
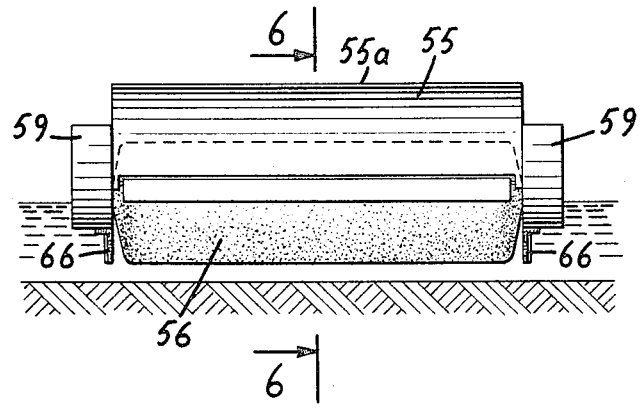
FIGURE 5 is a front elevation of another vehicle constructed in accordance with the invention and employing a lift-producing air foil surface.

FIGURES 5 and 6 depict another form of amphibious air cushion vehicle in which the central portion of the vehicle, i.e., the main vehicle body 55, includes an upper surface 55a which is contoured to form an airfoil capable of developing substantial lift at moderate and high vehicle speeds. As before, large diameter soft rollers 56 and 58 are located generally fore and aft of the vehicle body 55 and are deflatable and retractable to the positions shown by the phantom lines for good high-speed performance. At either side of the main body 55 is located a catamaran-type flotation hull 59 which provides water-borne buoyancy. Each of the rollers 56, 58 is disposed in a well or chamber adjacent a high pressure air plenum 60, 61, the forward air plenum 60 being partially occupied by the roller 56 when retracted. Pressurized air is supplied to the plenums through the ducts 62a, 62b connected to a source represented by the supply manifold 62c extending transversely of the vehicle body. At the rear of the vehicle, the air plenum 61 has an interior which is contoured to exhaust pressurized air over the top of the roller surface 58a. The exhausting layer of pressurized air over the top of the roller 58 is transformed, when the roller is rotated in the direction shown, into a boundary vortex air layer which is circularly transmitted underneath the vehicle, as shown by the arrows, due to the "Coanda" effect of roller rotation.

Disposed rearwardly of the back roller 58 is a control surface or flap 63 which is pivotable about point of support 64 to change the contour of the airfoil and thereby provide pitch attitude and lift control for the vehicle. As shown by the broken-line arrows representing air flow, the flap and a portion of the upper surface of the roller 58 are located adjacent the boundary layer of fluid passing over the top of the airfoil 55a. Rotation of the rollers in the directions indicated functions in the manner explained above to produce the fluid vortex layers. At the ground surface, elemental volumes within these layers have a velocity containing both vertical and horizontal components so that at least part of the air flow volume is utilized in maintaining the pressure in the air cushion region. As in the previous embodiment, the vehicle includes a pair of air cushion skirts 66 which may comprise flexible nozzles to contain the lateral extent of the air cushion.

Sealing the chamber of the plenum 60 from the air cushion region underneath the vehicle is an elongated sealing flap 68 which may be either rigidly or flexibly constructed to bear against the roller surface 56a. A similar flap 69 is located adjacent the rear roller 58 to seal the rear chamber 61 from the air cushion region. It will be appreciated, however, that either of the flaps 68, 69 can be pivotally mounted to provide a laterally extending port adjacent the roller surface if desired.

Figure 7:
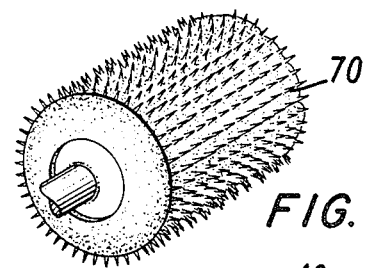
FIGURES 7 and 8 are partial perspective views of rollers in which the roller surface is formed to induce a fluid vortex about the roller.
Figure 8:
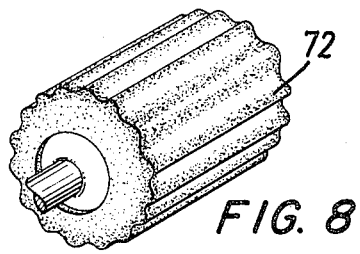

FIGURES 7 and 8 show alternate constructions of rotatable elements or rollers which may be used with air cushion craft of the general construction shown in FIGURES 1–3 and FIGURES 5 and 6. In both figures the roller is generally cylindrical in cross-section. However, in order to induce optimum vortex circulation around the roller, the roller surfaces are provided with radial projections, two forms of which are illustrated. In FIGURE 7, a multiplicity of radially projecting bristle-like elements 70 are used to increase the efficiency of coupling between the viscous fluid and the roller surface. In FIGURE 8, the roller surface is equipped with circumferentially spaced, axially extending corrugations 72 which, likewise, effectively improve the coupling between the roller surface and adjacent fluid. Another manner in which this may be done is to make the roller surface very rough to increase the coupling co-efficient of friction to the fluid.

Figure 10:
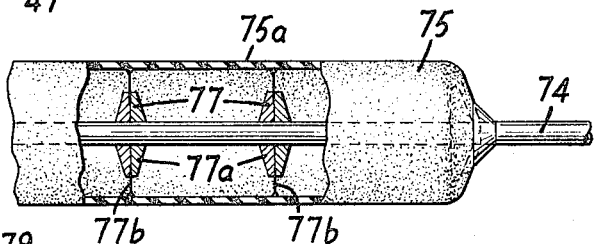
Figure 11:
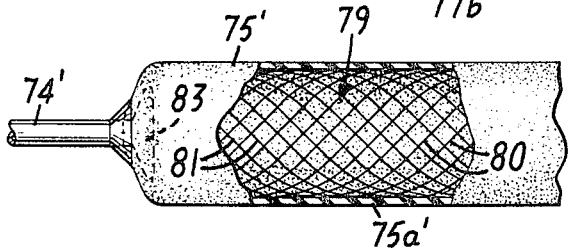

Because of the appreciable length of the rollers and because they must be flexible or collapsible in order to adapt to deflation and inflation, it is preferable to provide the roller assembly with some kind of structure to transmit a torque between the drive shaft and the roller throughout its length. FIGURES 10 and 11 depict two preferred forms of roller construction for adequate transmission of torque between a roller shaft 74 and the circumferential wall 75a of the roller 75. In FIGURE 10, the shaft 14 extends axially throughout the length of the roller 75. Located intermediate the roller ends are torque discs 77 which include a smaller radius hub portion 77a attached to the shaft 74 and a thin disc 77b extending radially between the hub 77a and the wall 75a of the roller. These thin discs 77b may be flexible or resilient to deform axially of the roller when the roller is deflated, while at the same time remaining rigid to circumferentially acting torque forces when the roller is inflated.

In FIGURE 11, the collapsible roller 75' is formed with a network 79 of cords integral with the roller wall 75a'. This network 79 may comprise, for example, a first plurality or set of generally parallel and helically extending cords 80 and a second set of similar cords 81 which form angles with the cords 80 of the first set. In this form, shafts 74' are coupled to the ends of the roller 75' by means of the flared hubs 83.

Figure 12:
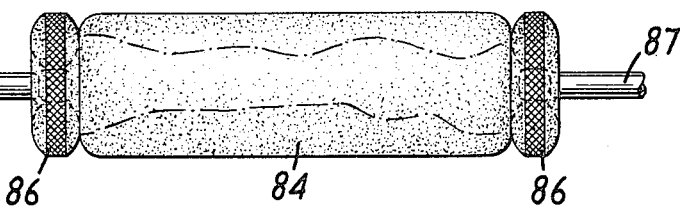
FIGURES 12 and 13 are front elevations of roller and wheel assemblies for use in vehicles in accordance with the invention.
Figure 13:
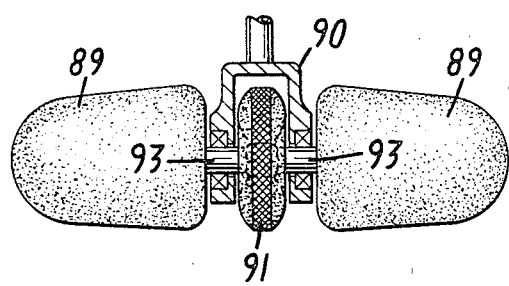

FIGURES 12 and 13 show combined roller and tire assemblies which enhance the vehicle's performance in the overland mode of operation. In the assembly of FIGURE 12, the deflatable roller 84 is located between a pair of wheeled tires 86 mounted on a common shaft 87. The phantom lines indicate the outline of the roller 84 when partially collapsed by deflation. In FIGURE 13, the roller takes on a split form wherein a roller 89 of shorter axial length is located on either side of steerable wheel carriage 90, the rollers 89 and tire assembly 91 being journaled for rotation on a common shaft 93. As shown, the rollers 89 are tapered outwardly of the carriage 90 to form a pair of coaxial cones so that, for ease of steering during ground wheeled operation, the total roller surfaces are not in direct engagement with the ground. The tapered structure additionally allows a smaller well space (air chamber) to be used for any given desired vehicle turning radius.

Figure 14:
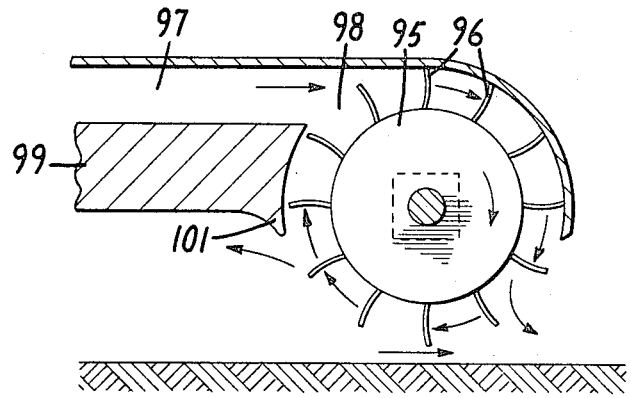
FIGURES 14 and 15 are cross-sectional representations of further forms of roller and vehicle air chamber construction.

FIGURE 14 shows a portion of a vehicle in accordance with the invention in which the roller 95 is provided with a plurality of circumferentially spaced, projecting flexible vanes 96 which function to pump or compress the air issuing from the port 97 connecting the air chamber 98 to the high pressure air supply (not shown). Adjacent the passage formed between the interior body portion 99 and the roller 95 is a lip 101 which separates or peels the vortex layer of fluid from the surface of the roller underneath the vehicle. The lip 101 directs the vortex layer in a direction to maintain the air cushion and precludes total recirculation of the air forced into the air cushion region underneath the vehicle.

Figure 15:
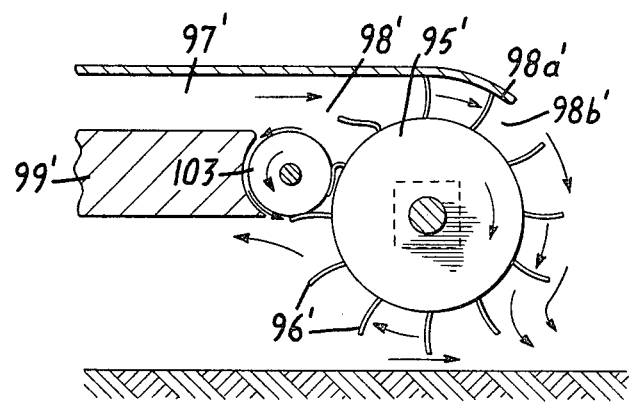

FIGURE 15 shows a modification of the assembly of FIGURE 14. There an anti-recirculation roller 103, which may be either driven or freely rotatable, is located between the body portion 99' and the roller 95' such that as the flexible vanes 96' move past the roller 103, they are deflected downwardly against the roller surface. In this manner, the return of air into the high pressure chamber 98' is blocked and most of the air circulated underneath the vehicle by the rotary motion of the roller 95' is retained in the air cushion region. Additionally, the forward portion of the upper wall 98a' of the air chamber is recessed to a point above the axis of roller rotation so that the exhaust port 98b' for the issuing fluid is also above the rotational axis of the roller 95'. This alternate construction effects a reduction in the total weight of the vehicle, but does not materially lessen the lift force obtained from the levitation jet and fluid vortex. This fact is due to the tendency of the fluid vortex to adhere to the roller surface and thereby to be carried therearound and underneath the vehicle into the air cushion region.

Figure 16:
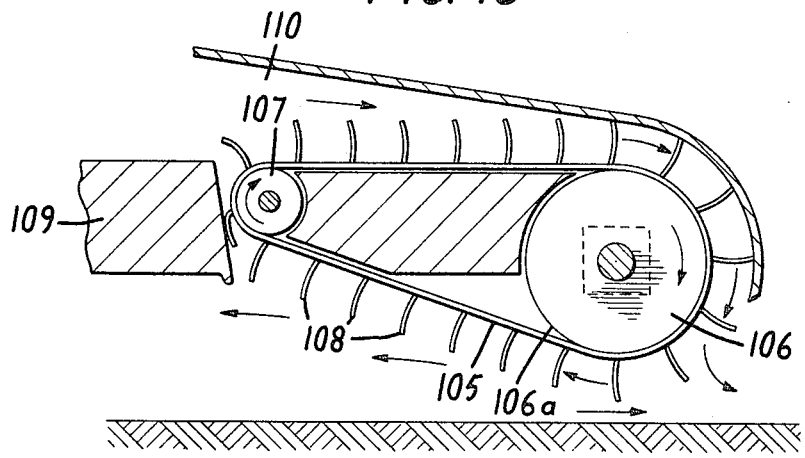
FIGURE 16 is a cross-sectional view of a modification of the assembly shown in FIGURE 15 in which an endless belt is employed for driving the main roller and inducing fluid motion over portions of the belt surface.

Referring now to FIGURE 16, there is shown another form of roller assembly in which an endless belt 105 connects the main roller 106 with a drive roller 107 of which the rotational axis is generally parallel to that of the main roller. The belt 105, like the roller 95' in FIGURE 15, is provided with a plurality of longitudinally spaced flexible vanes 108 which improve the air pumping action caused by roller rotation. The drive roller 107 is situated relative to the vehicle body portion 109 such that the drive roller also functions as an anti-recirculation device similar to the roller 103 in FIGURE 15. By increasing the moving surface area in contact with the pressurized air in the chamber 110, i.e., by using a wide belt as shown, the pressurized air in the chamber 110 can be accelerated to greater circular velocities around the boundary configuration defined by the surface 106a of the roller. In other words, the roller assembly of FIGURE 16 is more effective as an air pump than is the scheme shown, for example, in FIGURE 14. It should be emphasized, however, that in this regard the function of the rollers and roller assemblies described is not that of a primary air pump or compressor, but rather means by which a fluid vortex layer may be induced to feed and contain the air cushion. In direct engagement with a ground surface or in water, the belt drive assembly of FIGURE 16 may serve as the primary source of rolling traction.

Figure 17:
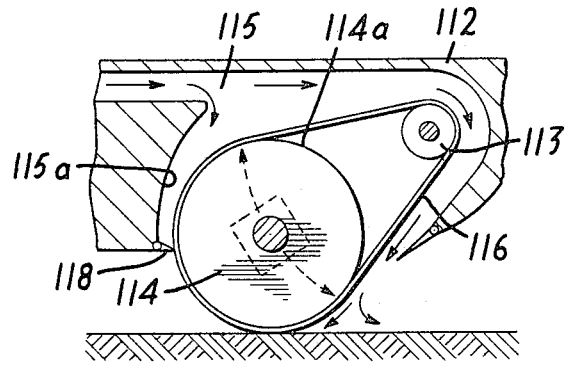
FIGURES 17–19 are cross-sectional views through a portion of a vehicle of the type shown in FIGURE 1, illustrating alternate methods of driving the vehicle rollers.
Figure 18:
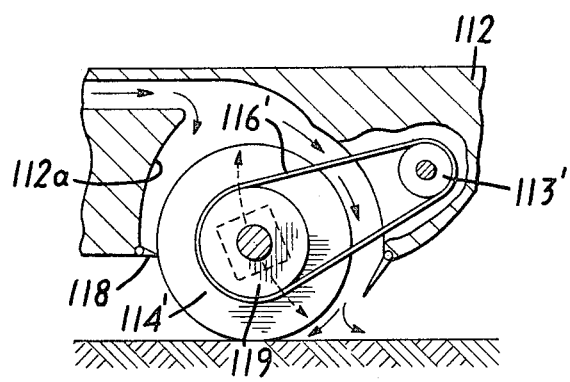

FIGURES 17 and 18 depict two forms of belt drives for the vehicle 112. The scheme shown in FIGURE 17 is similar to that in FIGURE 16, except that the relative positions of the drive roller 113 and the main roller 114 are reversed. As shown in FIGURE 17, the drive roller 113 is disposed, relative to the main roller, in the direction of air flow from the high pressure air chamber 115. In this case, however, the fluid flow follows the contour of the wide belt 116 connecting the two rollers and is therefore substantially linear near the portion of the belt traveling in the downward direction until the flow reaches the bottom of the roller where the vortex around the roller surface becomes effective. As in some of the previous embodiments, a sealing flap 118 is provided between the roller surface 114a and the air chamber surface 115a.

In FIGURE 18, a chain or narrow drive belt 116' engages a drive pulley 113' and the pulley 119 connected to the shaft of the main roller 114'. In this construction, the belt is part of the roller drive means and does not directly affect the air flow over the roller surface. In these last two embodiments the roller 114 or 114' may be retracted by movement of the roller shaft about a pivotal radius extending from the center of the roller 113 or pulley 113', as shown by the broken line indicating the path of the roller center during retraction and extension.

Figure 19:
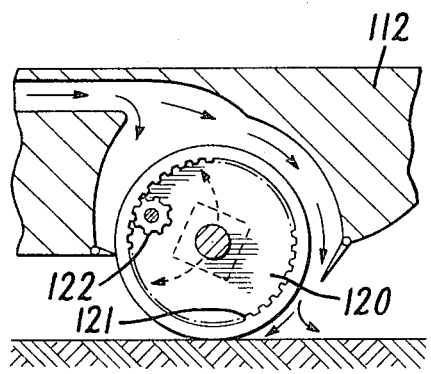

FIGURE 19 illustrates a further form of roller drive in which a roller 120 is driven through a ring gear 121 at one end thereof. The ring gear 121 is internally toothed for engagement with a small pinion gear 122 about which the center of the roller 120 is pivoted for roller retraction and extension. In all cases discussed in which the roller is retractable, conventional means, such as the hydraulic jack 49 illustrated in FIGURE 19, may be employed to move the roller between the retracted and extended positions. Screw jacks, rack and pinion gear arrangements or electric motor actuators, given here as alternative examples, are also compatible with the invention.

While in the various drive systems described, the rollers may be driven at lower rotational velocities during wheeled operation to furnish traction, such separate means as gas turbine thrust engines may be employed to propel the vehicle. In this event, the rollers may be disconnected from their respective drive sources for freewheeling rotation. For airborne operation, of course, conventional propulsion plants mounted to or in the vehicle body can be employed.

In summary, the invention provides a versatile amphibious vehicle which may be easily adapted to high, low and intermediate speed operation. The versatility of the vehicle may be attributed to a combination of factors including the use of vortex-generating rollers which also serve as conventional wheeled support means. Moreover, because the vehicle may employ soft rollers, it has valuable application to uses demanding superior traversing ability over rough, uneven or wet ground surfaces.

Although the invention has been described with reference to specific embodiments thereof, many substitutions, modifications and variations, both in form and detail, will occur to those skilled in the art. All such substitutions, modifications and variations, therefore, are intended to be included within the scope of the invention as defined in the appended claims.

I claim:

1. In a vehicle for traveling over a stationary surface and of the type which is capable of being at least partially supported on an air cushion developed underneath the vehicle, the air cushion being contained within a periphery beneath the lower surface of the vehicle: a vehicle body having an air supply chamber; an elongate element rotatably mounted adjacent the air supply chamber to have a surface portion thereof located below the lower surface of the vehicle body and extending in the direction of elongation along a portion of the air cushion periphery, an interior surface of the air chamber and the element forming between them a levitation air jet channel; air source means for supplying air at superatmospheric pressure to the air chamber to develop a downwardly directed air levitation jet in the channel; and means for rotating the element to maintain in conjunction with the levitation jet a vortex of air around at least part of the surface portion of the element and toward the undersurface of the vehicle when the vehicle is supported on the air cushion.

2. A vehicle in accordance with claim 1 in which: the rotatable element has a surface portion disposed approximately along a forward portion of the cushion periphery relative to the vehicle body; the vehicle includes a second air supply chamber supplied by the air source means; the vehicle further comprising a second elongate element rotatably mounted adjacent the second chamber to have a surface portion thereof located below the lower surface of the vehicle body and extending in the direction of elongation approximately along a rear portion of the cushion periphery relative to the vehicle body, an interior surface of the second chamber and the second element forming therebetween a further air levitation jet channel; and means for rotating the second element to maintain a vortex of air around at least part of the surface portion of the second element when the vehicle is supported on the air cushion.

3. A vehicle in accordance with claim 1, further comprising means for preventing recirculation of the vortex fluid layer into the air supply chamber.

4. In a vehicle for traveling over a stationary surface and of the type which is capable of being at least partially supported on a fluid cushion developed underneath the vehicle, the fluid cushion being contained within a cushion periphery beneath a lower surface of the vehicle: a vehicle body; an elongate rotatable element capable of movably supporting the vehicle on the stationary surface; means for rotatably mounting the element to the vehicle body to have a portion of the element surface located below a lower surface of the body and exposed to the air cushion; means for supplying a fluid at superatmospheric pressure to at least a portion of the surface of the element to develop thereover, during operation of the vehicle, a fluid levitation jet directed substantially downwardly toward the stationary surface; and means for rotating the element to create a fluid vortex layer around the rotatable element surface and in a direction to circulate the fluid in the vortex layer underneath the element and beneath the lower surface of the vehicle body when the vehicle is supported by the air cushion.

5. A vehicle in accordance with claim 4, further comprising means for controllably regulating the thickness of said levitation jet and vortex layer developed over the surface of said elongate rotatable element.

6. A vehicle as set forth in claim 4 in which the rotatable element is generally cylindrical.

7. A vehicle as set forth in claim 4 in which the rotatable element is provided with corrugations extending along the surface thereof in the direction of element elongation.

8. A vehicle in accordance with claim 4 in which the surface of the rotatable element is provided with a multiplicity of generally radially projecting, bristle-like members adapted to increase the adherence of the fluid to the element surface when the element is rotated.

9. A vehicle as set forth in claim 4 in which the rotatable element includes a plurality of radially projecting, circumferentially spaced webs extending along the element in the direction of element elongation.

10. A vehicle according to claim 4 in which: the elongate element is hollow and is supported for rotation on a shaft extending through the hollow interior and the ends thereof; and further comprising at least one torque-transmitting member mounted to the shaft intermediate the ends of the element and extending rigidly and outwardly from the shaft for connection to the circumferential wall of the element.

11. A vehicle as defined in claim 4 in which the rotatable element comprises a collapsible enclosure, and further comprising means for inflating and deflating the enclosure.

12. A vehicle according to claim 11 in which: the means rotatably mounting the elongate element includes an axial shaft extending from one end thereof for supporting the element at the one end, the shaft having a passage therethroguh communicating with the interior of the collapsible enclosure and a supply of gas at superatmospheric pressure.

13. A vehicle in accordance with claim 11 in which: the enclosure is generally cylindrical and includes first and second pluralities of generally parallel cord elements extending helically around the enclosure from one end to the other end thereof, the individual cord elements of the first and second pluralities being disposed so as to intersect to form angles therebetween, the cord elements further being integral with the circumferential wall of the enclosure to transmit torque from the ends of the enclosure to intermediate portions of the circumferential wall thereof.

14. A vehicle in accordance with claim 4, further comprising means for moving the element between the position in which a lower portion of the element surface extends below the lower surface of the vehicle body and a second position in which the element is at least partially retracted to within the vehicle body.

15. A vehicle according to claim 4 in which the rotatable element includes an elongate inflatable and deflatable enclosure and a wheel assembly, the assembly comprising a pair of axially spaced ground engageable wheels mounted, respectively, at either end of the enclosure for coaxial rotation therewith.

16. A vehicle as recited in claim 4 wherein the rotatable element comprises a wheel assembly including a wheel adapted to engage the stationary surface and a pair of conical members tapered toward their outer ends and coaxially mounted for rotation with the wheel.

17. A vehicle as set forth in claim 4 in which the vehicle body includes a central portion having a curved upper surface shaped to form a lift-producing airfoil extending from a forward end to a rearward end of the vehicle.

18. A vehicle according to claim 17 adapted for operation over water, and further comprising a pair of flotation hulls at either side of said central portion of the vehicle body.

19. Apparatus in accordance with claim 17, further comprising: a second elongate element rotatably mounted to the vehicle body to have a portion of the element surface located below the lower surface of the body for exposure to the air cushion and to have a further portion of the element surface exposed to a fluid boundary layer created over a rearward portion of the airfoil surface during forward motion of the vehicle; means for supplying a fluid at superatmospheric pressure to a portion of the second elongate element surface; and means for rotating the second elongate element to maintain a fluid vortex layer around the portion of the surface thereof exposed to the fluid boundary layer from the airfoil surface and in a direction of rotation to circulate the fluid in the vortex layer underneath the second element and beneath the lower surface of the vehicle body when the vehicle is supported by the air cushion.

20. A vehicle as set forth in claim 19, further comprising a control surface disposed rearwardly of the second elongate element for exposure to the fluid boundary layer over the airfoil surface and forming a trailing edge for the airfoil, the control surface being pivotal about an axis substantially parallel to the axis of rotation of the second element.

21. In a vehicle for traveling over a stationary surface and of the type which is capable of being at least partially supported on an air cushion developed underneath the vehicle: a vehicle body having an air supply chamber; a cylindrical element capable of movably supporting the vehicle rotatably mounted adjacent the supply chamber and disposed so as to have a surface portion thereof projecting below the lower surface of the vehicle body; an endless belt having a width substantially coextensive with the axial length of the cylindrical element; a source of air at superatmospheric pressure connected to the air supply chamber; means supporting the belt for longitudinal movement thereof over a portion of the surface of the cylindrical element and disposed to provide for the belt an upper run to receive the air at superatmospheric pressure, the belt forming in relation to the supply chamber an air levitation jet channel having an exhaust port effective to cause the air from the source to be directed downwardly toward the stationary surface; and means for rotating the cylindrical element to create an air vortex layer adjacent a portion of the belt in contact with the cylindrical element.

22. A vehicle in accordance with claim 21 in which the supporting means for the belt comprises a cylindrical roller having an axis substantially parallel to the rotational axis of the cylindrical element.

23. A vehicle as set forth in claim 21 in which: the supporting means for the belt is located, relative to the vehicle body, rearwardly of the cylindrical element, the exhaust port is adjacent the portion of the belt in contact with the cylindrical element, and the cylindrical element is disposed in relation to the air supply chamber so that the levitation jet channel extends from an upper surface of the cylindrical element to the exhaust port.

24. A vehicle as claimed in claim 21 in which the supporting means for the belt is disposed, relative to the vehicle body, forwardly of the cylindrical element.

25. A vehicle according to claim 21 wherein the belt includes a plurality of laterally extending, longitudinally spaced webs projecting from the top surface thereof.

26. In a vehicle for traveling over a stationary surface and of the type which is capable of being at least partially supported on a cushion of pressurized fluid developed underneath the vehicle: a vehicle body; a pair of cylindrical rollers disposed, respectively, forwardly and rearwardly of the vehicle and rotatably mounted to the vehicle body for movably supporting the vehicle on the stationary surface, each of the rollers forming between a surface portion thereof and the vehicle body a laterally elongated levitation jet channel having an exhaust port for directing fluid received therein over the surface of the roller toward the stationary surface; means for introducing fluid at superatmospheric pressure into the levitation jet channel; and means for rotating the element to create and maintain in conjunction with the channel a vortex of fluid around at least a part of a surface portion of the roller extending beneath the vehicle body and toward the undersurface of the vehicle when the vehicle is supported by the air cushion.

References Cited

UNITED STATES PATENTS

| | | | |
|---|---|---|---|
| 3,195,666 | 7/1965 | Lewis et al. | 114—67 |
| 3,207,245 | 9/1965 | Wieland | 180—7 |
| 3,276,529 | 10/1966 | Latimer-Needham | 180—7 |

ANDREW H. FARRELL, *Primary Examiner.*